United States Patent [19]

Nowobilski

[11] Patent Number: 5,445,857

[45] Date of Patent: Aug. 29, 1995

[54] TEXTURED VACUUM INSULATION PANEL

[75] Inventor: Jeffert J. Nowobilski, Orchard Park, N.Y.

[73] Assignee: Praxair Technology, Inc., Danbury, Conn.

[21] Appl. No.: 997,438

[22] Filed: Dec. 28, 1992

[51] Int. Cl.⁶ .................................................. 532B 3/28
[52] U.S. Cl. ......................................... 428/69; 428/74;
428/75; 428/76; 428/174; 428/187; 52/573.1
[58] Field of Search .................. 428/69, 72, 74, 75,
428/76, 174, 187; 52/799, 795, 573.1

[56] References Cited

U.S. PATENT DOCUMENTS

| | | | |
|---|---|---|---|
| 2,742,556 | 10/1952 | Bovenkerk | 219/19 |
| 3,003,902 | 10/1961 | McDuff | 428/75 |
| 3,031,358 | 4/1962 | Rutter et al. | 154/44 |
| 3,302,358 | 2/1967 | Jackson | 52/573 |
| 3,412,518 | 11/1968 | Waite | 52/799 |
| 3,936,553 | 2/1976 | Rowe | 428/81 |
| 4,783,356 | 11/1988 | Kugelmann, Sr. | 428/69 |
| 4,791,773 | 12/1988 | Taylor | 52/790 |
| 4,837,388 | 6/1989 | Kugelmann | 428/69 |

Primary Examiner—Alexander S. Thomas
Attorney, Agent, or Firm—Alvin H. Fritscher

[57] ABSTRACT

Vacuum insulation panels are provided with textured surfaces that localize thermal expansion thereof. Large thermal strains that could produce cracking and warping of the panels is thereby avoided.

9 Claims, 6 Drawing Sheets

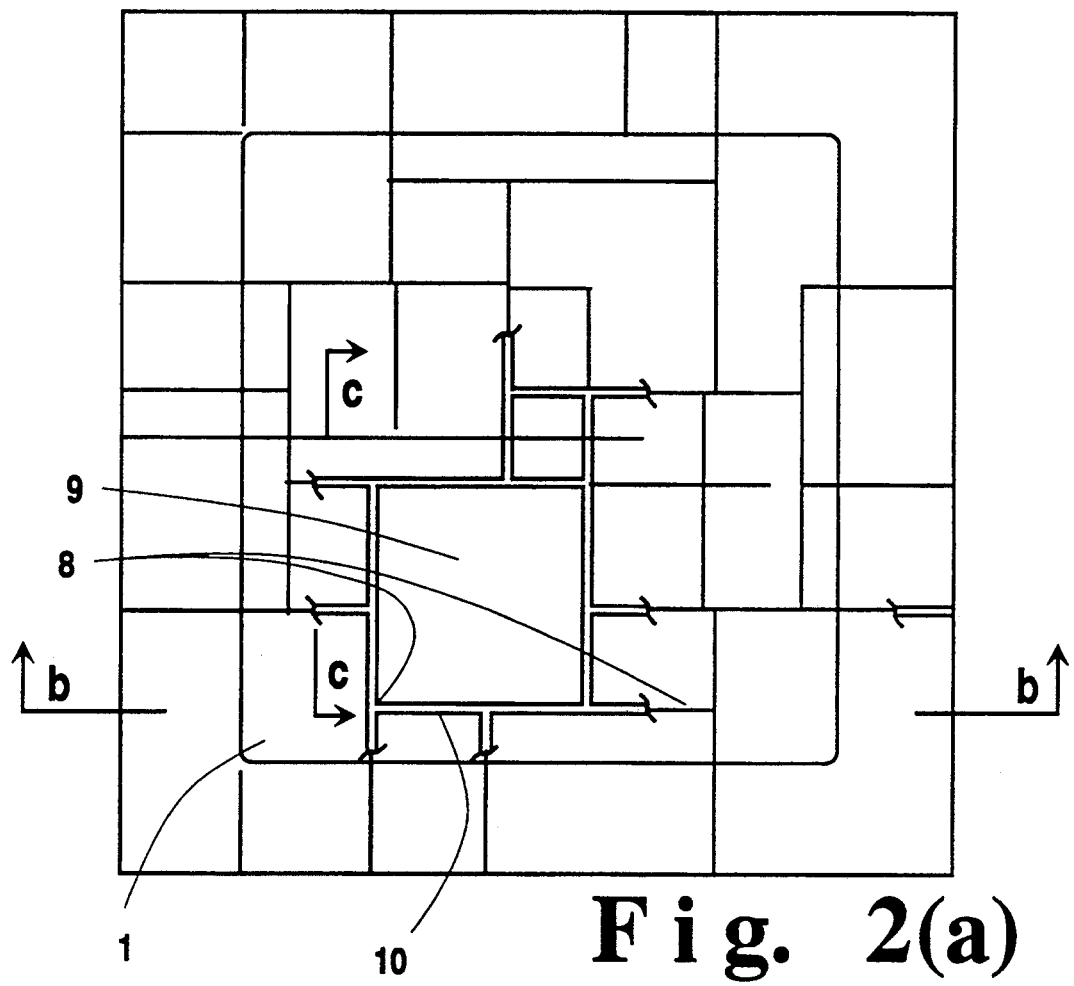
Fig. 2(a)
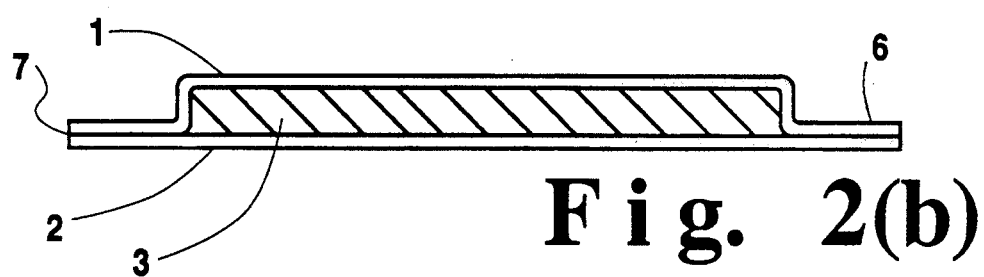
Fig. 2(b)
Fig. 2(c)
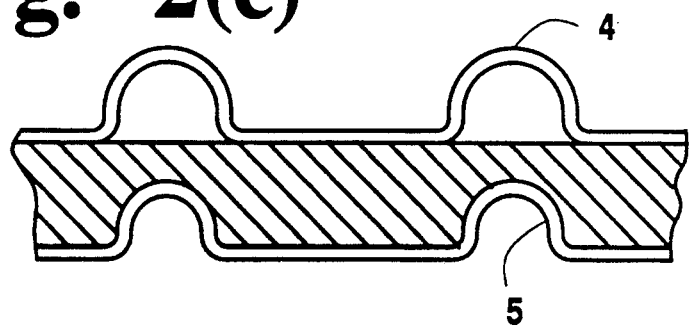

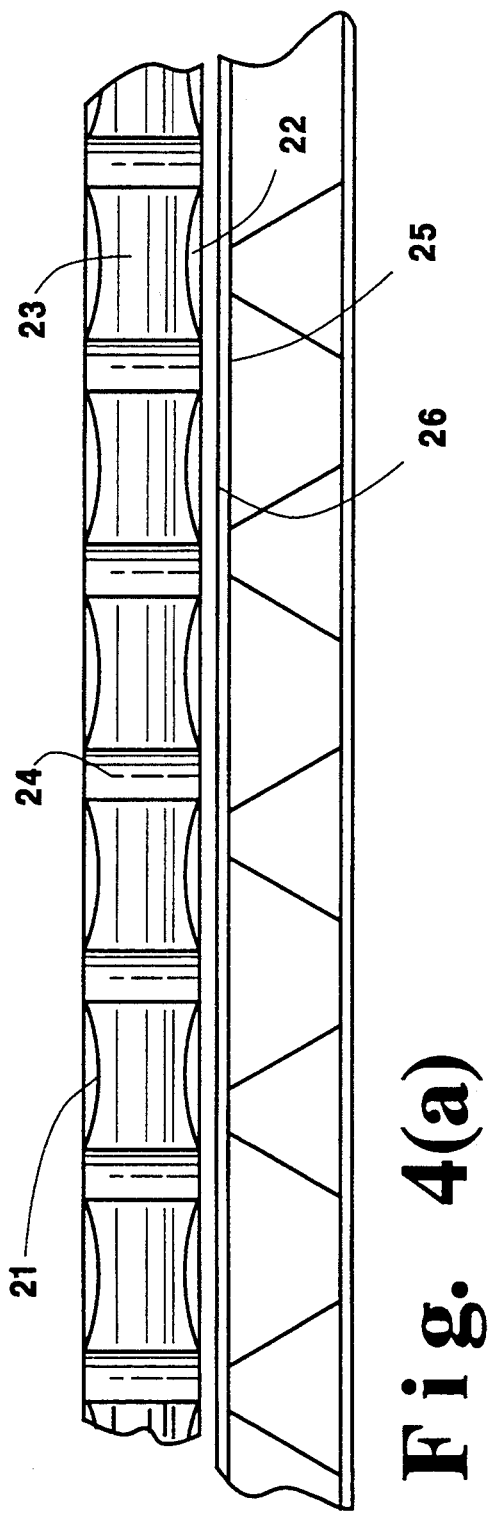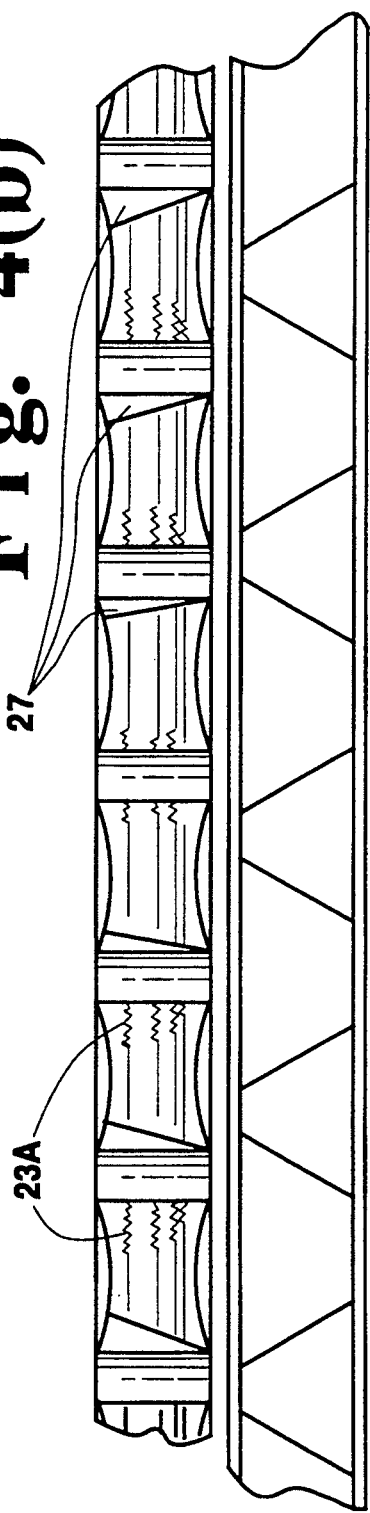
Fig. 4(a)
Fig. 4(b)

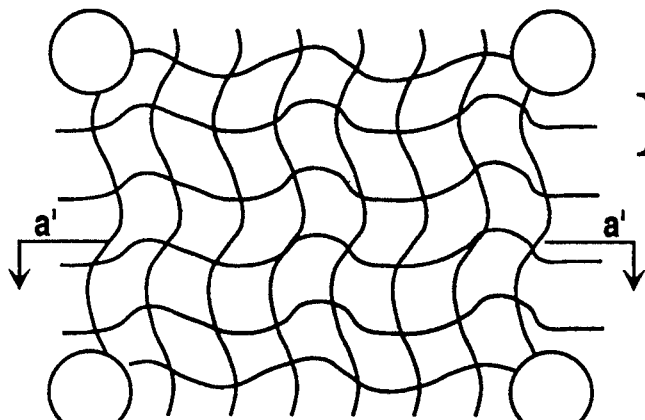
Fig. 5(a)
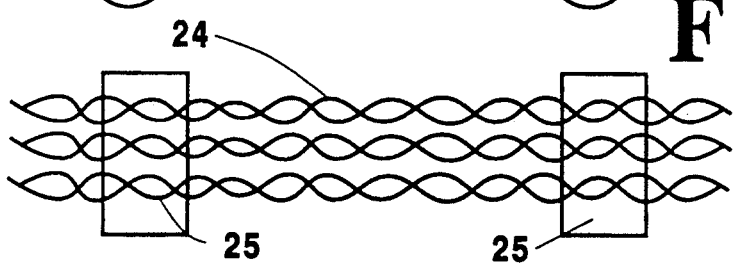
Fig. 5(a')
Fig. 5(b)
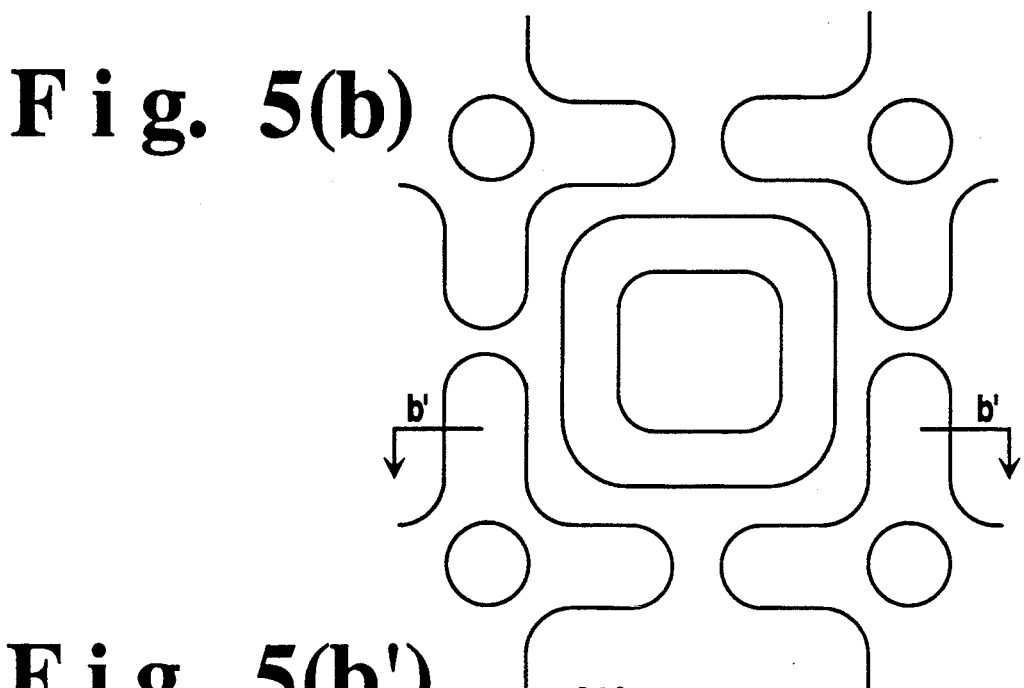
Fig. 5(b')
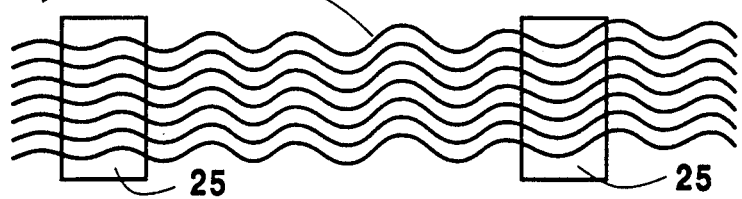

TEXTURED VACUUM INSULATION PANEL

BACKGROUND OF THE INVENTION

1. Field of the Invention

The invention relates to panel insulation systems. More particularly, it relates to relieving the thermal strain in vacuum panel insulation systems exposed to large temperature differences.

2. Description of the Prior Art

Vacuum panel insulation systems have been practiced in many forms in the art. Such systems are desirable since they can be easily fitted to odd shapes, can be made lightweight, provide easy maintenance, and can be mass produced at low cost. When subjected to large temperature differences, however, thermal strains are developed in the vacuum envelope and in the internal insulation. These result in undesired warpage and/or breakage of the panel due to the temperature difference between the top and bottom surfaces thereof, and to the joining together of the top and bottom edges of the panel in a rigid manner.

In light of such warpage problems, panels have been designed with a variety of edge sections in an attempt to decouple the hot and cold sections thereof. Edge sections have been proposed in the form of corrugated bellows, and shallow edge angles have been proposed, but have not been found to be workable for large thin panels subjected to large temperature differences. In this regard, it should be understood that the thickness of typical vacuum insulation panels ranges from ¼" to 1". Fabricating an expansion joint in this small distance to accommodate movements of ⅛" to ½" is extremely difficult. As a result, the size of vacuum panels has been limited by such problems associated with the design of the edge expansion joints thereof.

It is an object of the invention therefore, to provide an improved panel insulation system.

It is another object of the invention to provide vacuum panels overcoming the warpage caused by thermal strains when subjected to large temperature differences.

With these and other objects in mind, the invention is hereinafter described in detail, the novel features thereof being particularly pointed out in the appended claims.

SUMMARY OF THE INVENTION

A textured panel surface allows thermal strains to be relieved on almost a continuous basis over the entire surface thereof. Thermal expansion is localized, and large thermal strains that could cause warpage or otherwise damage the panel are minimized.

BRIEF DESCRIPTION OF THE DRAWINGS

The invention is further described herein with reference to the accompanying drawings in which:

FIG. 2 is a plan view and sections of a rigid board bearing insulation panel of the invention, in which:

FIG. 2(a) is a plan view of an embodiment of the insulation panel of the invention;

FIG. 2(b) is a sectional view taken along section 1—1 of said FIG. 2(a); and

FIG. 2(c) is a sectional view taken along section 2—2 of said FIG. 2(a);

FIG. 3 is a schematic drawing illustrating expansion joint movement, in which:

FIG. 4 is side elevational view of a peg supported multi-layer panel of the invention, in which:

FIG. 4(a) illustrates the panel under ambient temperature conditions; and

FIG. 4(b) illustrates the panel under the temperature differences of operating conditions; and FIG. 5 is a schematic view illustrating foil expansion joint patterns employed in the peg supported panels of the invention, in which:

FIG. 5(a) shows a particular surface texturization embodiment of the invention; and FIG. 5(b) shows an alternative embodiment with several corrugations positioned between support pegs.

DETAILED DESCRIPTION OF THE INVENTION

Figure 1A:
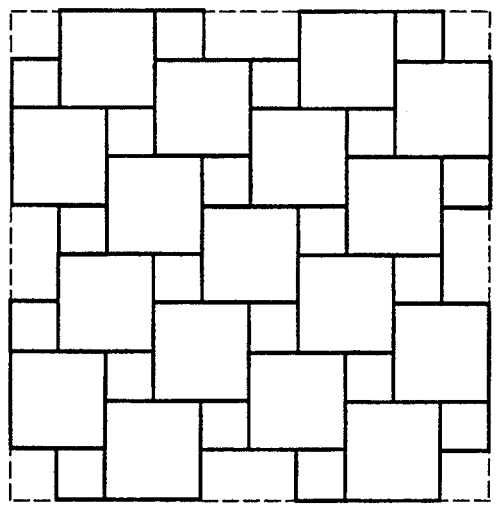
FIG. 1 is a plan view of five representative expansion joint patterns used in the practice of the invention.
Figure 1B:
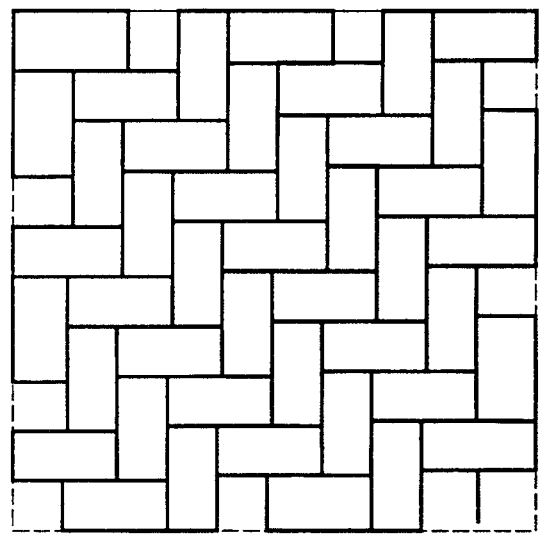
Figure 1C:
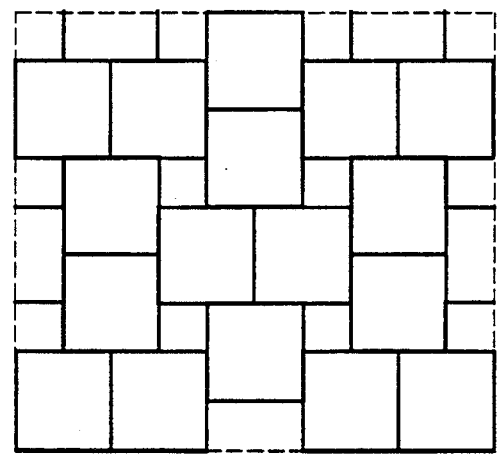
Figure 1D:
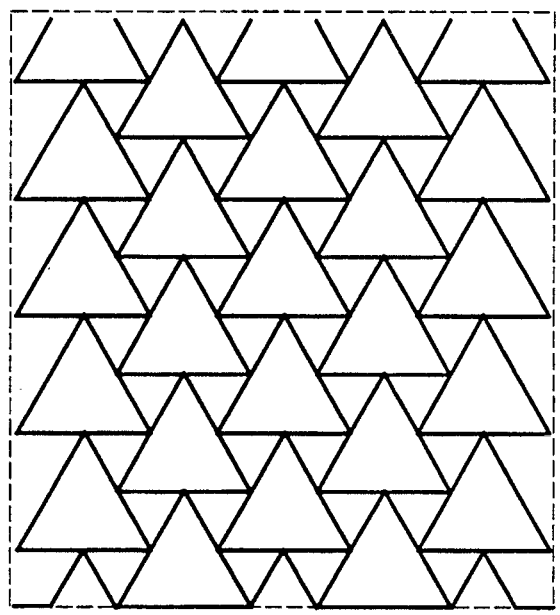
Figure 1E:
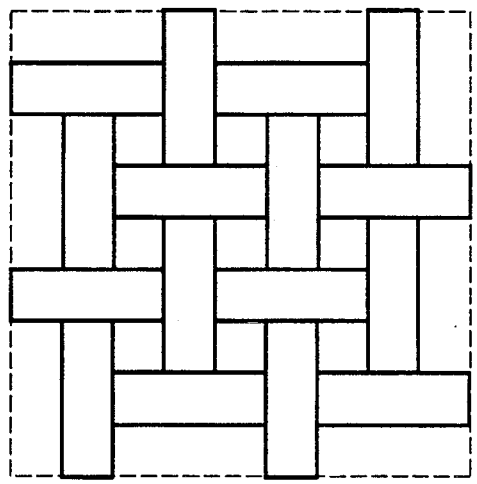

Vacuum panels fall into two types depending on the manner in which the vacuum load is transmitted through the panel. In the first type of panels, the load is transmitted over the surface of the panel to the entire surface of the insulation. The insulation in this case is either a precompressed board or a fibrous material that is compressed by the atmospheric load and is referred to as load bearing insulation. In the second type of vacuum panel, the atmospheric load is transmitted through the vacuum envelope to discrete support pegs that penetrate the non-load bearing insulation. The non-load bearing insulation consists of thin metal foils or metalized plastic film radiation barriers, such as copper foils, or metalized plastic foils, separated by low conductivity spaces, such as by low conductivity spacer material, e.g. fiberglass or organic paper or organic netting. All of the loads are taken by the support pegs, and the insulation is uncompressed. The envelope expansion joint pattern is utilized on the first type of panels in which the load is transmitted through the load bearing insulation. Texturing of the radiation barriers or metal foils is utilized in the non-load bearing part of the insulation in the peg support insulation system.

The invention serves to move thermal strain relief for the panel envelope from the edge of the panel to the surfaces of the panel. Strains developed in the insulation radiation barriers are relieved in a similar manner to the vacuum envelope and prevent the panel foils from tearing.

The textured or contoured surface of the invention, which allows thermal strain to be relieved on nearly a continuous basis over the entire surface of the panel, serves to decouple the size of the panels from the edge design and allows the panel to be fabricated to any desired size. Relieving the thermal strain in the internal insulation foils greatly increases the thermal performance of the insulation system by preventing undesirable radiation windows from forming.

The surface expansion joint system consists of a series of non-continuous expansion joints that are formed into the vacuum barrier or envelope of the vacuum panel. The pattern of the expansion joints are such that any single one continues for only a short distance before intersecting and stopping at another expansion joint that is at a convenient angle e.g., 90°, or 60° from another, as illustrated by the various expansion joint patterns of FIG. 1 of the drawings.

The expansion joint allows movement of the insulation material surrounding it by deformation of its shape. The continuation of any one expansion joint for only a short distance allows the material along the length of the expansion joint to move into the portion of the expansion joint at either of its ends. Once the pattern is defined, it is simply repeated over the entire surface of the panel, although it is within the scope of the invention to employ different patterns on the same panel. The pattern can be carried to the edges of the panel such that, in particular embodiments, the top and bottom covers fit together. This requires that a top cover expansion joint pattern is out of the surface of the insulation, while a bottom expansion joint pattern is into the surface. The nesting of the top and bottom expansion joint systems facilitate the joining of the two sections. This arrangement is preferred, since it facilitates maintaining the insulation panel on a flat surface. In the event that the insulation volume of the panel needs to be maximized, the expansion joint pattern can be positioned to face out on both surfaces of the panel.

The thermal movements of the radiation barriers in a peg supported vacuum insulation system has not been fully appreciated in the past, due to the small size and application of the vacuum panels under consideration. However, for a large 8' long vacuum panel with the hot side of 1500° F. and the cold side at −423° F. (liquid hydrogen, i.e. LH$_2$) using copper foil radiation barriers and a stainless steel shell, the foils on the cold side will shrink 0.16" from ambient to LH$_2$ temperature, while the panel will expand 0.58", assuming it is fixed to the hot outer wall. In this case, the maximum foil movement will occur on the cold side at the edge of the foil. The foils will contract 0.74" relative to the pegs, which will expand with the outer walls of the vacuum enclosure. The resulting relative motion will cause tearing of the foil, and a large increase in the thermal conductivity of the panel.

In order to stop the tearing of the foils, the thermal strain has to be relieved on an incremental, e.g. inch/inch, basis. This is accomplished in the practice of the invention by texturing the foil, such that its length and width are reduced at least 0.015 in/in. The exact shape of the texturing is not critical so long as the textured material is able to undergo a bi-axial elongation of the required amount.

In the practice of the invention to relieve the thermal strain developed in vacuum panel insulation systems when subjected to large temperature differences, it will thus be understood that the expansion joint system is used on the vacuum envelope of a vacuum panel using a load bearing insulation board. A surface texturing contouring expansion system is used on the radiation barriers of a peg-supported multi-layer insulation system used in a vacuum panel. The vacuum panel using a load bearing insulation with the surface expansion joint system of the invention is shown in FIG. 2 of the drawings.

In said FIG. 2, the numeral 1 represents the top cover of the vacuum panel, having bottom panel 2 and load bearing, board insulation 3 in the vacuum space of said panel between top cover 1 and bottom panel 2. Expansion joints 4 are provided in top panel cover 1, and expansion joints 5 are provided in bottom panel cover 2. Top and bottom panel expansion joints 6, with edge weld 7, are produced at the edge of the panel. The intersection of two expansion joints in the top or bottom of enclosure covers 1 and 2 is represented by the numeral 8, with area 9 existing between the expansion joints.

Figure 3A:
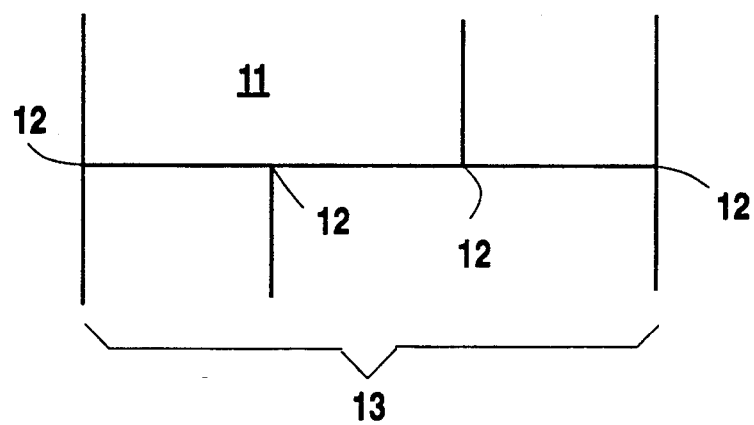
FIG. 3(a) illustrates expansion joint centerlines under ambient temperature conditions.
Figure 3B:
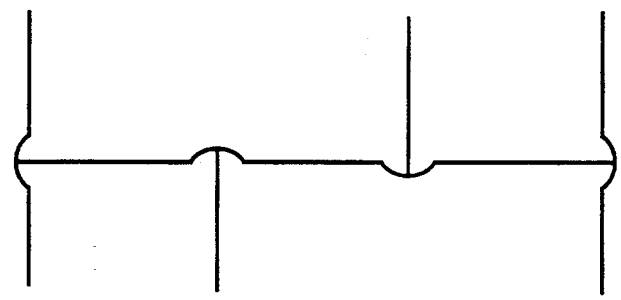
FIG. 3(b) illustrates expansion joint centerlines under elevated temperature conditions.

In the operation of the expansion joint system of the invention, the surface of the panel covers, of either metal or non-metal material, will expand or contract, while an insulation board, typically made of glass, quartz or ceramic material, will remain relatively fixed because of its much lower coefficient of thermal expansion. It is also within the scope of the invention, however, to employ an insulation material having a higher coefficient of thermal expansion so long as the expansion thereof is such that the panel covers can tolerate without deformation or degradation. Upon heating, any of the areas of the panel covers between expansion joints, i.e., area 9, will expand and move above the insulation and deform the adjacent expansion joint, e.g., expansion joint 10. This relieves the thermal stress in the areas between the expansion joints. The material along the length of the expansion joints, e.g., metal or plastic expansion joints 10, will also expand and will deform the mid-points of the intersecting expansion joints and relieve the stress along the length of the expansion joint. Such expansion joint movement is shown in FIG. 3, wherein FIG. 3(a) shows the centerlines of expansion joints arranged in a particular pattern under ambient temperature conditions and FIG. 3(b) shows the deforming of the mid-points of intersecting expansion joints under elevated temperature conditions.

In the practice of the invention, therefore, large stress will not build up along the length of the expansion joint so as to cause it to buckle and, after several thermal cycles, to crack. It will be understood that a crack in the surface of the panel would cause a loss of vacuum, resulting in a loss of the insulating properties of the panel. The art has heretofore approached this problem by forming a second small expansion joint on top of the main expansion joint. However, the necessary double expansion joint die is very difficult to machine, and the pattern is difficult to form in metal. Furthermore, it is difficult to form the metal in the required shape, and very difficult to weld to form a vacuum tight enclosure.

In the design of expansion joints, the maximum movement required of the expansion joint is determined by the maximum size of the area between the expansion joints, i.e., area 11 in FIG. 3, the material of construction, and the temperature change that the side of the panel will undergo. The particular size of an expansion joint for a particular application can then be determined using standard stress analysis equations known in the art, or a finite element program such as ANSYS. The termination of each of the expansion joints, i.e., numeral 12 in said FIG. 3, must also be considered because this will give a local area of higher deformation. The larger deflection is a result of the area 11 of material, plus the line of material along the edge of the expansion joint, i.e., numeral 13, which, on expansion, will deform the expansion joints at terminations 12. It will be appreciated that the maximum height of the expansion joint, in each particular case, will be determined by the properties of the vacuum envelope material as well as the forming method used for its preparation. For example, the allowable deformation of aluminum will be greater than the deformation of titanium. The same principle will be understood to pertain if the vacuum panel covers are formed from plastic or other non-metals.

In a representative expansion joint of the invention, a herringbone pattern as shown in FIG. 1 was employed in a panel made of Iconel 625. The spacing of the expansion joints were 1"×2". The expansion joint height was 0.121" and the width was 0.284". The outer radius was 0.082", and the inner radius was 0.062." The vacuum panel envelope was Inconel 625, and the insulation was a fibrous quartz board. The overall dimensions of the panel were 18.682"×14.770" and the panel thickness was ¼". The panel was successfully thermal cycled one time with the concave side at −320° F. and the convex side about 1500° F., and three times to 1500° F. on both sides. Examination of the panel after thermal cycling revealed no buckling on the expansion joints or in the area between expansion joints. The panel did not warp during such testing.

The peg supported multi-layer panel of the invention is shown in FIG. 4 of the drawings. In this embodiment of the invention, the thermal expansion of the panel is relieved by the depressions on the surface of the panel between the support pegs. In the drawing, the vacuum panel has top cover 21, bottom cover 22, multi-foil insulation 23, and support pegs 24. A tank wall is represented by the numeral 25, with space 26 existing between the vacuum panel and the tank wall. Space 26 is maintained under a mild vacuum to hold the panel to tank wall 25 so that bottom cover 22 of the vacuum panel will move with said tank.

FIG. 4(a) illustrates ambient temperature conditions. Under such ambient conditions and before the first thermal cycle, support pegs 24 and foils 23 are aligned in their proper positions, and no gaps exist between the pegs and foils. When the panel is in use, top cover 21 is cooled to −423° F., LH$_2$ temperature, and tank wall 25 and bottom cover 22 are heated to 1300° F. In this condition, the hot side wall 22 will move out from the center line 0,012 in/in. with the tank wall and, acting through support pegs 24, stretch wall 21. Foils 23, which in conventional practice do not have any expansion relief, will tear and be compressed by the peg on the side furthest from the center line, i.e. compressed areas 23A, and will have gaps by the pegs on the side of the pegs closest to the center line. In a large 8' long panel, the gaps could be as much as 0.74" at the edges of the panel, forming radiation windows 27. Such radiation windows and foil thermal shorting will severely degrade the thermal performance of the panel embodiments.

In the peg supported multi-layer panel embodiments of the invention, the foils are textured so that they have any expansion joint system built into the surface, thereby giving the foils the ability to stretch in two directions. As a result, the foils will stretch, rather than tear, around the pegs. The support pegs are typically spaced on 1" centers so that the foil's texturing or expansion joint pattern has to be able to accommodate 0.012 in/in. elongation. FIG. 5 illustrates two expansion system embodiments of the invention. In the FIG. 5(a) embodiment, foil 24 between support pegs 25 is shown with a particular form of surface texturization obtained, for example, by the use of a crumbled piece of aluminum foil that is unfoiled for use, but remains in the crinkled form illustrated. In the FIG. 5(b) embodiment, several corrugations 24A of foil are positioned between the support pegs. The latter embodiment will be seen as similar to the vacuum cover sheets of the embodiments of FIG. 1–3.

While the expansion joint patterns of the invention were developed for use in vacuum panels, it will be understood that they can also be employed for non-vacuum applications as well, particularly where large metal surfaces undergo large thermal strains and their edges are restrained and precluded from expansion. Aircraft engine covers and furnace wall liners are examples of such application of the invention.

As indicated above, the expansion joint employed in the practice of the invention can be of any noncontinuous pattern, and need not be of one of the five patterns illustrated in FIG. 1. All of the patterns employed have a short expansion joint that terminates at a desired intersection angle along the length of an adjacent expansion joint. It should be noted that it is within the scope of the invention to employ said expansion joints on only the top or on the bottom surface of the insulation, or on both surfaces thereof, on the outer or inner sides thereof, for the desired texturing purposes.

The interconnecting expansion joints for load bearing insulation panels, and the crinkled or corrugated foils of peg supported insulation panels, represent highly advantageous embodiments of the textured insulation panels of the invention. By the use of such textured or contoured panels, the thermal expansion of vacuum and other insulation panels, under practical operating conditions, is desirably localized. Thus, large thermal strains that could damage the insulation panels are advantageously avoided. The use of such panels, without cracking and warping, is thereby facilitated, and the art pertaining to vacuum insulation panels is advanced thereby.

I claim:
1. An improved insulation panel comprising:
 (a) a top cover portion;
 (b) a bottom cover portion;
 (c) load bearing insulation means positioned in the space between the top cover and said bottom cover; and
 (d) texturizing means throughout the insulation panel, so as to move thermal strain relief for the panel from the edge of the panel to the surfaces thereof so that thermal strain can be relieved on a continuous basis over the entire surface of said insulation panel, and to localize thermal expansion of the top cover portion, the bottom cover portion, or said insulation means, said texturizing means comprising a series of expansion joints positioned along the edge and across said top cover portion and said bottom cover portion, on the outer or inner sides thereof, in a pattern such that each individual expansion joint extends for only a short distance before intersecting at an angle, and terminating at, another expansion joint of said series, such a pattern being repeated over the entire surface of the panel, said expansion joints being adapted to allow expansion movement of the cover material adjacent thereto by deformation of the shape of said expansion joint, said movement serving to relieve the thermal stress in the area between the expansion joints of said pattern and along the length of said expansion joints, thereby precluding the build up of large thermal stress along the length of the expansion joints and relieving thermal strains that would otherwise occur across the entire surface of the insulation panel upon it being subjected to large temperature differences in the top cover and the bottom cover portion of the insulation panel, whereby the insulation panel is capable of use, in cyclic thermal operations under such large temperature differences, without cracking or warping.

2. The insulation panel of claim 1 in which said top cover portion and said bottom cover portion are metal portions, and said insulation means has a much lower coefficient of thermal expansion than the metal top cover portion and the metal bottom cover portion.

3. The insulation panel of claim 1 in which the space between said top cover and said bottom cover is a vacuum space, said insulation panel being a vacuum insulation panel.

4. The insulation panel of claim 1 in which said individual expansion joints intersect one another at angles of 90°.

5. The insulation panel of claim 1 in which said individual expansion joints intersect one another at angles of 60°.

6. The insulation panel of claim 1 in which said insulation means comprises precompressed insulation board.

7. The insulation panel of claim 1 in which said insulation means comprises fibrous insulation material.

8. The insulation panel of claim 1 in which the expansion joint pattern is carried out to the edges of said insulation panel.

9. The insulation panel of claim 8 in which said series of expansion joints are positioned across both said top cover portion and said bottom cover portion, and said top cover expansion joint pattern extends outward from the insulation surface and said bottom cover expansion joint extends inward to said insulation surface, thereby enabling said top cover portion and said bottom cover portion to fit together.

* * * * *